Feb. 15, 1927.
A. WILD
AUTOMATIC HEAT REGULATOR
Filed Feb. 7, 1925
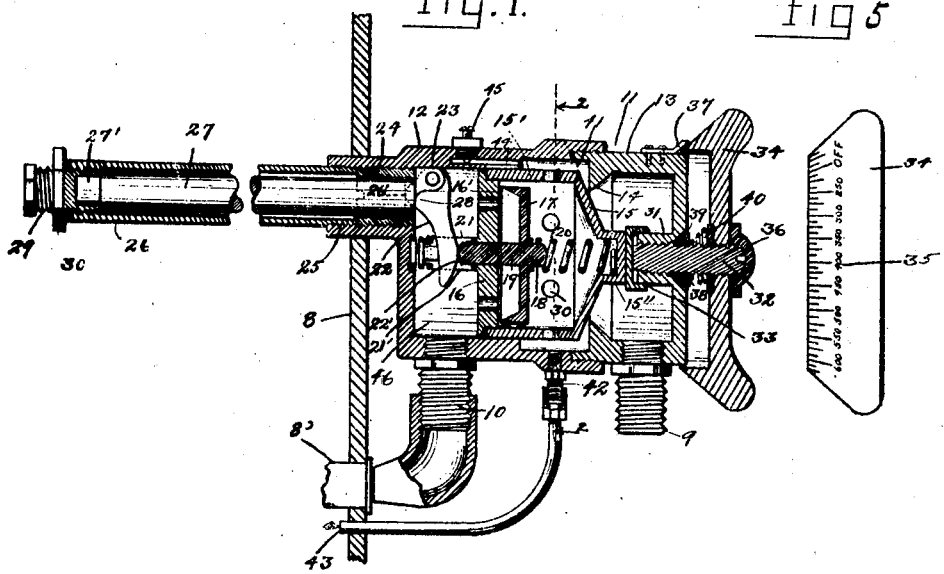
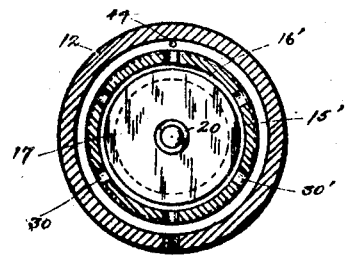
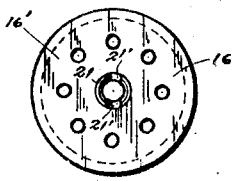
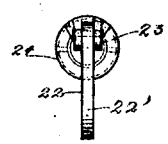
INVENTOR.
Alfred Wild.
BY
Morsell, Keeney & Morsell
ATTORNEYS Patented Feb. 15, 1927.

1,617,886

UNITED STATES PATENT OFFICE.

ALFRED WILD, OF MILWAUKEE, WISCONSIN, ASSIGNOR TO AMERICAN STOVE COMPANY, OF ST. LOUIS, MISSOURI.

AUTOMATIC HEAT REGULATOR.

Application filed February 7, 1925. Serial No. 7,557.

This invention relates to improvements in automatic heat regulators, more particularly adapted for use in controlling the heat of household ovens.

Ovens now on the market are usually provided with valves for controlling the supply of fuel gas and also for controlling the degree of temperature of the oven, and in the ordinary constructions it is necessary to turn several valves to secure the desired temperature.

Furthermore, many of the present day regulators have a gas valve between the main gas supply pipe and the thermostatic regulator. In use the regulator is shut off and if the gas valve is not also turned off, a dangerous condition exists due to the fact that the regulator is usually provided with a by pass which will permit the flow of sufficient gas to heat the oven to 150 degrees, and if the by pass valve is not properly adjusted the flame will be extinguished, and the gas leak will continue to flow and is a source of danger.

It is one of the objects of the present invention to overcome the above mentioned objectionable features and provide an automatic heat regulator in which both the supply of fuel gas and the regulation of the temperature is controlled by a single element.

A further object of the invention is to provide an automatic heat regulator in which the movement of the thermostat controlling the regulation of the heat is compounded in a very simple and direct manner to permit the use of a valve of smaller diameter, but movable a greater distance from its seat, thus eliminating possibility of small particles of dirt lodging between the seat and the valve, which might prevent the closing of the valve.

A further object of the invention is to provide an automatic heat regulator in which the thermostatic member is protected and concealed from view and is leak-proof.

A further object of the invention is to provide an automatic heat regulator which is easily attachable to any right or left handed stove and may be directly connected to the manifold supply pipe of the stove at any angle desired.

A further object of the invention is to provide an automatic heat regulator in which a single manually operated element controls the opening of the supply valve, the regulation of the flow of the gas and the adjustment to produce a predetermined temperature.

A further object of the invention is to provide an automatic heat regulator having visible means for indicating the different temperatures for setting the control member.

A further object of the invention is to provide an automatic heat regulator in which the supply of fuel is automatically decreased when the desired temperature has been obtained.

A further object of the invention is to provide an automatic heat regulator having means for regulating the thermostatic member with relation to the other portions of the regulator.

A further object of the invention is to provide an automatic heat regulator which is of simple construction, is strong and durable, and is well adapted for the purpose described.

With the above and other objects in view, the invention consists of the improved automatic heat regulator and its parts and combinations as set forth in the claims, and all equivalents thereof.

In the accompanying drawing in which the same reference characters indicate the same parts in all of the views:

Fig. 1 is a longitudinal sectional view of the improved automatic heat regulator shown connected to a portion of an oven;

Fig. 2 is a transverse sectional view taken on line 2—2 of Fig. 1;

Fig. 3 is a face view of one of the movable members of the regulator;

Fig. 4 is an edge view of the compounding lever and its connected part; and

Fig. 5 is a side view of the knob for adjusting the regulator.

Referring to the drawing, the numeral 8 indicates an oven part, and 8' the burner thereof, which is supplied with fuel gas for heating the same by means of pipes 9 and 10, the pipe 9 being connected to a source of gas supply and the other pipe 10 being connected to the burner of the oven. The improved controller is interposed between and is connected to the two pipes so that the gas flowing through the pipes passes through the regulator. Said regulator comprises a two part casing 11 of tubular construction and closed at its opposite ends. The two portions 12 and 13 are threaded together and the inner annular edge of the part 13 is beveled to form a valve seat 14 which is engaged by a reciprocal floating valve 15 within the casing. The valve is formed with a tubular extension or skirt 15' which closely and slidingly fits the bore of the casing part 12 and is guided thereby. Said extension at its inner end is closed by a perforated guide cap member 16 and said cap member forms a flat valve seat 16' which is engaged by an automatic valve 17 reciprocally positioned within the floating valve 15. The automatic valve 17 on opposite sides is formed with centrally projecting stems 18 and 19, the outer one 18 of which is engaged by one end portion of a coiled spring 20 interposed between the valve 17 and the closed reduced end portion 15'' of the valve 15. The inner projecting stem 19 extends through and is guided in the slotted and bored stem 21 of the perforated guide cap member 16. Said guide cap member 16 moves with the valve 15 and its inner side stem 21 is positioned to bear against the rounded end portion 22' of the long arm of the bell crank lever 22 which extends through the slotted portion 21' of the stem 21. A bearing 23 formed on the end of a threaded sleeve 24 provides a fulcrum for the bell crank lever 22. The sleeve 24 is threaded into a flanged opening 25 formed in the inner end of the casing part 12 and eccentric to the axis of its diameter. A tubular expansion member 26 is also threaded into the flanged opening 25 and is adapted to contain a rod member 27 of relatively less expansibility than the tubular member 26 which is preferably formed of brass, bronze or other like material.

The end of the rod 26 adjacent the lever 22 is formed with a transverse slot 26' to receive the shorter arm 28 of the bell crank lever 22 while the opposite end of the expansion rod is formed with a reduced portion 27' which extends into the end socket of an adjusting screw 29 threaded into the end of the tube 26. A lock nut 30 threaded on said screw holds the same in adjusted position, so that when adjusted the greater expansion of the tube 26 will relieve pressure on the bell crank lever, and the coiled spring 20 will move the valve 17 towards its seat 16' to reduce the flow of gas to the burner and thus adjust the temperature of the oven.

The floating valve 15 is formed with transverse openings 30 which admit the passage of gas to the tubular portion of the valve in flowing between the valve 17 and its seat 16.

The outer end portion of the casing part 13 is formed with an inwardly extending annular flange 31, and through the outer end portion of the flange an adjusting screw 32 extends and is threaded. The inner end of the screw bears against a cap member 33 which is interposed between the outer end of the valve 15 and the inner end of the screw 32, and is guided on the flange 31. The outer end of the screw 32 has a threaded engagement with a dial handle 34 which is provided with characters 35 to indicate the off position and different degrees of heat. A cap nut 36 locks the handle in adjusted position and a pointer 37 coacts with the dial in adjusting the valve to a position to give the desired temperature.

A packing 38 surrounds the screw 32 and is yieldingly held in position by a washer 39 and a coiled spring 40 to prevent the escape of gas between the screw and the casing part 13. Said spring also serves to frictionally retain the dial handle in adjusted position. The space or chamber 41 in the casing between the two valves, and which is closed by said valves when they are in closed position, is provided with a small gas outlet pipe 42 which supplies gas for the pilot light 43 in the oven. Said pilot light gas enters the chamber 41 from the supply pipe 9 to keep the pilot light 43 burning as long as the valve is turned on. To avoid having the burner flame extinguished if the valve 17 temporarily closes, a by pass duct 44 is provided which is controlled by a needle valve 45 and permits a sufficient flow of gas to keep the oven burner burning. If it should be extinguished it will again light from the pilot light 43. The gas will pass through the by pass duct 44 and into the outlet chamber 46 in front of the valve 16 and then through the pipe 10 to the pilot burner. When the handle is turned to closed position the gas to the burner and the pilot light will be turned off.

In use and in operation the tubular expansion member 26 extends into the oven of the stove and the tubes 10 and 42 are connected to the burners while the tube 9 is connected to a source of fuel gas supply. Normally the valves 15 and 17 are in closed position, and if it is desired to heat the oven, the dial handle 33 is turned clockwise to the mark indicating the temperature desired, and this movement will move the valve 15 away from its seat and the valve seat 16' away from the valve 17. As the valve 17 is maintained in its position by the expansion tube and the lever and the guide member 21, the movement of the valve seat 16' will permit the flow of gas between the valve and its seat and to the burner and be ignited from the pilot light. Now as the temperature of the oven increases, the tubular expansion member 26 will expand to a greater extent than the rod 27 and move the said rod 27 away from the short arm of the bell crank lever 22. This movement will permit the spring 20 to move the valve 17 towards its seat 16' and lessen the flow of gas to the burner 8', and when the desired temperature has been reached, the further expansion of the tubular member 26 will cause the said valve to close and stop the supply of gas to the burner 8' with the exception of the small amount which is supplied through the duct 44. The turning of the dial handle anticlockwise to turn off the gas to the burner will close the supply to the burner and to the pilot light. The provision of the screw 29 at the end of the expansion tube 26 provides for adjusting the parts to close the valve 17 at the desired temperature.

From the foregoing description it will be seen that the automatic heat regulator provides a unitary device which is of simple and compact construction and requires only the turning of one handle to control the turning on and off of the gas and the temperature of the oven, and furthermore the eccentric relation of the thermostatic member to the valve casing permits the regulator to be positioned close to the upper portion of the stove without projecting above said top portion.

What I claim as my invention is:

1. A thermostatic fuel control, comprising a housing having gas inlets and outlets, a manually adjustable valve within the housing, a second valve contained within the first valve, and a thermostatic means actuating the second valve to control the flow of gas, for the purpose described.

2. A thermostatic fuel control for oven burners, comprising a housing, a hollow manually adjustable valve within the housing, a second valve within the hollow valve, a thermostatic means controlling the second valve, a gas inlet connected with said housing outside of the first-mentioned valve, a gas outlet connected with the said housing at a point inside of both of said valves, said outlet being connected with a burner, the parts operating for the purpose described.

3. The combination with a stove having a burner, of a unitary automatic heat regulator therefor, comprising a fluid supply pipe, a pipe connected to the burner, a casing connected to both pipes and having a valve seat between the two pipes, a manually actuated valve within the casing and engageable with said seat for controlling the flow of fluid between the two pipes and having a valve seat movable with said valve, a second valve within the first mentioned valve and engageable with the seat thereof for automatically controlling the flow between the two pipes, a thermostatic means for moving the second valve in one direction, and other means for moving the second valve in the opposite direction.

4. The combination with a stove having a burner, of a unitary automatic heat regulator therefor, comprising a fluid supply pipe, a pipe connected to the burner, a casing connected to both pipes and having a valve seat between the two pipes, a manually actuated valve within the casing and engageable with said seat for controlling the flow of fluid between the two pipes and having a valve seat movable with said valve, a second valve within the first mentioned valve and engageable with the seat thereof for automatically controlling the flow between the two pipes, a thermostatic means for moving the second valve to open position, and a spring means for moving the second valve to closed position.

5. The combination with a stove having a burner, of a unitary automatic heat regulator therefor, comprising a fluid supply pipe, a pipe connected to the burner, a casing connected to both pipes and having a valve seat between the two pipes, a manually actuated valve within the casing and engageable with said seat for controlling the flow of fluid between the two pipes and having a valve seat movable with said valve, a second valve within the first mentioned valve and engageable with the seat thereof for automatically controlling the flow between the two pipes, a lever within the casing for moving the second valve to open position, a spring means for moving the second valve to closed position, and a thermostatic means for moving the lever.

6. The combination with a stove having a burner, of a unitary automatic heat regulator therefor, comprising a fluid supply pipe, a pipe connected to the burner, a casing connected to both pipes and having a valve seat between the two pipes, a manually actuated valve within the casing and engageable with said seat for controlling the flow of fluid between the two pipes and having a valve seat movable with said valve, a second valve within the first mentioned valve and engageable with the seat thereof for automatically controlling the flow between the two pipes, a bell crank lever within the casing and having a long arm for moving the second valve to open position, a coiled spring for moving the second valve to closed position, and a thermostatic means for engaging and moving a short arm of the bell crank lever.

7. The combination with a stove having a burner, of a unitary automatic heat regulator therefor, comprising a fluid supply pipe, a pipe connected to the burner, a tubular casing connected to both pipes and having a valve seat between the two pipes, a tubular valve within the casing and engageable with said seat and having a valve seat portion which slidingly engages the bore of the casing, a manually actuated handle positioned outside of the casing and having a stem portion for adjusting the position of the valve, a second valve within the tubular portion of the first valve and engageable with its seat portion for automatically controlling the flow of fluid between the two pipes, a lever within the casing for moving the second valve in one direction, a thermostatic means for moving the lever, and a yielding means for moving the second valve in the opposite direction.

8. The combination with a stove having a burner, of a unitary automatic heat regulator therefor, comprising a fluid supply pipe, a pipe connected to the burner, a tubular casing connected to both pipes and having a valve seat between the two pipes, a tubular valve within the casing and engageable with said seat and having a valve seat portion which slidingly engages the bore of the casing, a manually actuated handle positioned outside of the casing and having a stem portion for adjusting the position of the valve, a second valve within the tubular portion of the first valve and engageable with its seat portion for automatically controlling the flow of fluid between the two pipes, a bell crank lever positioned in the casing and having a long arm which bears against the second valve, an expansible tube connected to the casing, a rod of less expansibility than the tube positioned in said tube and between one end of the tube and a short arm of the bell crank lever, the expansion of said tube causing the second valve to move towards a closed position, and a yielding means for also moving the second valve towards a closed position.

9. The combination with a stove having a burner, of an automatic heat regulator therefor, comprising a pipe for supplying a fluid to the burner, a valve controlling the volume of fluid flowing through the pipe, a manually actuated valve controlling the flow of fluid through the pipe and also controlling the position of the valve seat of the first mentioned valve, and a thermostatic means eccentrically positioned with relation to the valves and adjacent the stove for controlling said first mentioned valve.

10. The combination with a stove having a burner, of an automatic heat regulator therefor, comprising a fluid supply pipe, a pipe connected to the burner, a casing connected to both pipes and having a valve seat between the two pipes, a manually actuated valve within the casing and engageable with said seat for controlling the flow of fluid between the two pipes and having a valve seat movable with said valve, a second valve within the first mentioned valve and engageable with the seat thereof for automatically controlling the flow between the two pipes, a thermostatic means extending in a line eccentric to the axis of the valves for moving the second valve in one direction, and other means for moving the second valve in the opposite direction.

11. A thermostatic fuel control for burners, comprising a housing having therein a valve seat, a manually adjustable hollow valve within the housing co-acting with said seat for the purpose described, a fuel inlet and a fuel outlet connected respectively on the inlet and outlet side of said housing, a second valve within the hollow valve and controlling the flow of fuel to the said fuel outlet, and a thermostatic member adapted to control the said inner valve, the parts adapted to operate, for the purpose specified.

12. A thermostatic fuel control for burners, comprising a housing having at one end a fuel inlet and at the other end a fuel outlet, the housing having a valve seat located between said inlet and outlet, a hollow valve in the housing co-operating with the said seat, the hollow valve having openings communicating with the housing, the inner wall of the hollow valve also having openings communicating with the fuel outlet, a valve within the hollow valve adapted to control the flow of fuel through the openings in the said inner wall, and a thermostatic member adapted to control the inner valve thus regulating the amount of fuel passing to the outlet, the parts operating for the purpose described.

13. A thermostatic fuel control for burners, comprising a housing having a fuel inlet and a fuel outlet, said housing having a manually operated valve located between the said inlet and outlet, a thermostatic control valve located within the housing and co-acting with the first said valve to control the passage of fuel to the said outlet, and a thermostat acting to regulate the said thermostatic valve, the parts co-operating for the purpose described.

14. A thermostatic fuel control, comprising a housing having a fuel inlet and a fuel outlet, a manually adjustable valve within the housing to cut off or to allow the flow of fuel to the housing beyond said valve, a second valve co-operating with the first said valve to control the flow of fuel through the housing to the outlet when the first valve is open, and a thermostatic member adapted to control the opening thereof, for the purpose specified.

15. A thermostatic fuel control, comprising a housing having a fuel inlet and a fuel outlet, of two valves located in the housing between the inlet and outlet, one valve being manually adjustable and the second valve co-operating with the first valve, whereby the manually operated valve may be set for a predetermined pressure, and a thermostatic member for controlling the said second valve, whereby a predetermined degree of heat can be regulated.

16. A thermostatic control for burners, comprsiing a housing having a fuel inlet and outlet, of a manually operated valve and a second valve co-operating therewith within the said housing, said housing having a valve seat co-operating with the first valve and also a passage-way located between the seat and the outlet for the purpose of feeding gas, a thermostatic member co-operating with the second valve for controlling the flow of gas to said outlet, whereby when the first valve is closed the flow of gas to the said passage-way is also wholly cut off through the said housing.

17. A burner, an automatic fuel valve for the said burner, a second fuel valve and a single operative member engaging the said second fuel valve and the automatic fuel valve whereby both valves are operated by said single member for the purpose described.

18. A heat regulator for oven burners comprising an automatically controlled burner fuel valve, a manually controlled fuel valve and a single adjustable member for controlling the fuel valve and the automatic burner valve.

In testimony whereof, I affix my signature.

ALFRED WILD.